US009234431B2

(12) United States Patent
Kowalski et al.

(10) Patent No.: US 9,234,431 B2
(45) Date of Patent: Jan. 12, 2016

(54) SEAL ASSEMBLY FOR CONTROLLING FLUID FLOW

(75) Inventors: Christian Kowalski, Oberhausen (DE); Fan Zhang, Oviedo, FL (US); Uwe Lohse, Remscheid (DE); Robert W. Sunshine, Hobe Sound, FL (US); Burkhard Voss, Dorsten (DE)

(73) Assignee: Siemens Energy, Inc., Orlando, FL (US)

( * ) Notice: Subject to any disclaimer, the term of this patent is extended or adjusted under 35 U.S.C. 154(b) by 1048 days.

(21) Appl. No.: 13/178,784

(22) Filed: Jul. 8, 2011

(65) Prior Publication Data

US 2012/0017594 A1 Jan. 26, 2012

Related U.S. Application Data

(60) Provisional application No. 61/365,828, filed on Jul. 20, 2010.

(51) Int. Cl.

| | |
|---|---|
| ***F02C 7/12*** | (2006.01) |
| ***F02K 3/02*** | (2006.01) |
| ***F02C 7/20*** | (2006.01) |
| ***F02C 6/08*** | (2006.01) |
| ***F01D 9/02*** | (2006.01) |
| ***F01D 11/00*** | (2006.01) |
| ***F01D 11/02*** | (2006.01) |
| ***F01D 11/18*** | (2006.01) |

(52) U.S. Cl.

CPC .............. *F01D 9/023* (2013.01); *F01D 11/006* (2013.01); *F01D 11/025* (2013.01); *F01D 11/18* (2013.01); *F05D 2240/56* (2013.01); *F05D 2300/502* (2013.01)

(58) Field of Classification Search

USPC ........... 60/796, 799, 262, 782, 785, 800, 806, 60/39.83

See application file for complete search history.

(56) References Cited

U.S. PATENT DOCUMENTS

| | | | | |
|---|---|---|---|---|
| 4,354,687 | A * | 10/1982 | Holland et al. | 277/413 |
| 4,813,608 | A * | 3/1989 | Holowach et al. | 239/265.37 |
| 5,333,993 | A * | 8/1994 | Stueber et al. | 415/174.5 |
| 5,601,402 | A * | 2/1997 | Wakeman et al. | 415/173.2 |
| 6,453,675 | B1 * | 9/2002 | Royle | 60/800 |
| 6,662,568 | B2 * | 12/2003 | Shimizu et al. | 60/799 |
| 6,668,559 | B2 * | 12/2003 | Calvez et al. | 60/796 |
| 6,675,585 | B2 * | 1/2004 | Calvez et al. | 60/796 |
| 6,679,045 | B2 * | 1/2004 | Karafillis et al. | 60/39.08 |
| 6,679,062 | B2 * | 1/2004 | Conete et al. | 60/796 |
| 7,234,306 | B2 * | 6/2007 | Aumont et al. | 60/796 |
| 7,234,918 | B2 * | 6/2007 | Brillert et al. | 415/173.5 |
| 7,237,387 | B2 * | 7/2007 | Aumont et al. | 60/796 |

(Continued)

*Primary Examiner* — Ehud Gartenberg
*Assistant Examiner* — Karthik Subramanian

(57) ABSTRACT

A seal assembly (50, 60) for a gas turbine engine for controlling air flow between a diffuser (48) and rotor disks comprising first and second annular flange ends (52, 54) and an annular seal mid-section (56) between and operatively connected to the flange ends (52, 54). The first and second annular flange ends (52, 54) abut respective outer frame members (46) of the diffuser, whereby a fluid flow path is formed between the seal assembly (50, 60) and the rotor disks (42). The first and second end flanges (52, 54) are composed of a material having a coefficient of thermal expansion that is substantially the same as a coefficient of thermal expansion of the material of the outer frame members (46). In addition, the material of the seal mid-section (56) has a coefficient of thermal expansion that is different than that of the materials of the annular flange ends (52, 54) and outer frame members (46).

15 Claims, 3 Drawing Sheets

(56) References Cited

U.S. PATENT DOCUMENTS

| | | | | |
|---|---|---|---|---|
| 7,237,388 | B2 * | 7/2007 | Aumont et al. | 60/796 |
| 7,249,462 | B2 * | 7/2007 | Aumont et al. | 60/796 |
| 7,296,415 | B2 * | 11/2007 | Coulon et al. | 60/799 |
| 7,303,372 | B2 * | 12/2007 | West et al. | 415/208.1 |
| 7,494,317 | B2 * | 2/2009 | Keller et al. | 415/136 |
| 7,574,864 | B2 * | 8/2009 | Ottmanns et al. | 60/736 |
| 7,600,370 | B2 * | 10/2009 | Dawson | 60/39.37 |
| 7,721,547 | B2 * | 5/2010 | Bancalari et al. | 60/752 |
| 7,823,389 | B2 * | 11/2010 | Seitzer et al. | 60/782 |
| 2004/0071548 | A1 * | 4/2004 | Wilson, Jr. | 415/173.1 |
| 2006/0024156 | A1 * | 2/2006 | Blatchford et al. | 415/170.1 |
| 2010/0146985 | A1 * | 6/2010 | Buchal et al. | 60/806 |

* cited by examiner

SEAL ASSEMBLY FOR CONTROLLING FLUID FLOW

This application claims benefit of the Jul. 20, 2010 filing date of provisional U.S. patent application 61/365,828 which is incorporated by reference herein.

FIELD OF THE INVENTION

The invention relates generally to seal assemblies that are incorporated in machines to control fluid flow. More specifically, the invention relates to seal assemblies that are used to control air flow in gas turbine engines, and such seal assemblies that are disposed at an interface of stationary and rotating components in a gas turbine engine

BACKGROUND OF THE INVENTION

In a machine such as a gas turbine engine, which includes a compressor, a combustor and turbine, seals or seal assemblies are disposed at various locations to minimize air leakage or control air flow direction. For example, annular seal assemblies or seal rings attached to a compressor exit diffuser create a flow path between the diffuser and rotor disks. The diffuser has an annular configuration and is coaxially aligned with a longitudinal axis of the rotor. Compressed air exits the compressor through the diffuser and is dispersed so that some air is drawn into the combustor for driving the turbine. In addition, some air exiting the compressor via the diffuser flows across components for cooling components, such as a combustor transition duct and components in a first stage of the turbine. However, some air will inevitably leak at locations such as the interconnection of the diffuser and compressor.

Older turbine engine designs operated at temperatures that were below the thermo-mechanical limitations of the engine component. Accordingly, significant cooling of spaces between components, such as the space between the diffuser and rotor disks, was not a primary objective for sealing. The seals included standard labyrinth or brush seals whose primary goal was to minimize leakage. However, more recent turbine engine designs demand higher operating temperatures, which may include temperatures that exceed the thermo-mechanical limitations of the component materials. Thus, controlling air flow in areas of the turbine, which were not previously required for cooling purposes, have now become more critical to controlling component temperatures so that the turbine engine operates more efficiently.

A prior art seal assembly 10 shown schematically in FIG. 1 is operatively connected to frame members 12 of a diffuser 14 facing rotor disks 22. The seal assembly 10 has an annular configuration and includes two end flanges 16 and 18 and a mid-section seal 20. As described above, the seal assembly 10 is intended to control the air flow or circulation of across components for cooling. The components 16, 18 and 20 of the seal assembly 10 as well as the diffuser 14 are all composed of materials having the same or substantially the same coefficient of thermal expansion ("CTE").

The diffuser 14 and the seal assembly 10 components (16, 18, 20) are composed of the same material and, therefore, have the same coefficient of thermal expansion as schematically represented in FIG. 1, the mid-section seal 20 is thinner than the end flanges 16, 18, meaning it has a small thermal mass and a higher heat transfer coefficient relative to the diffuser 14. The flange ends 16, 18 of the seal assembly 10 are constrained by the adjacent diffuser frame member 12 that heats up more slowly due to its higher thermal mass and lower heat transfer coefficient at that connection. Thus, during a transient operation, for example, when a turbine engine is run until it reaches a steady state of operation, the operating temperature increases. When the operating temperature of the engine reaches thermo-mechanical limitations of the seal assembly materials, the seal mid-section deforms radially outward relative to the longitudinal axis of the turbine rotor (not shown), in part because the ends 16, 18 are constrained by the frame member 12 of the diffuser 14. In addition, as a result of the rotation of the disks 22, a surface 24 of the disks 22 undergoes thermo-mechanical deformation radially toward the longitudinally axis of the rotor, thereby widening the gap between the seal mid-section 20 and the rotor disks 22. When the engine reaches a steady state of operation at elevated temperatures of 535° C. this variation in gap size between the components can create a pressure differential that may increase the volume of drawn from the diffuser into this gap area. Accordingly, less air discharged from the compressor is available for combustion, which directly affects the operating efficiency of the turbine engine.

BRIEF DESCRIPTION OF THE DRAWINGS

The invention is explained in the following description in view of the drawings that show.

DETAILED DESCRIPTION OF THE INVENTION

Figure 2:
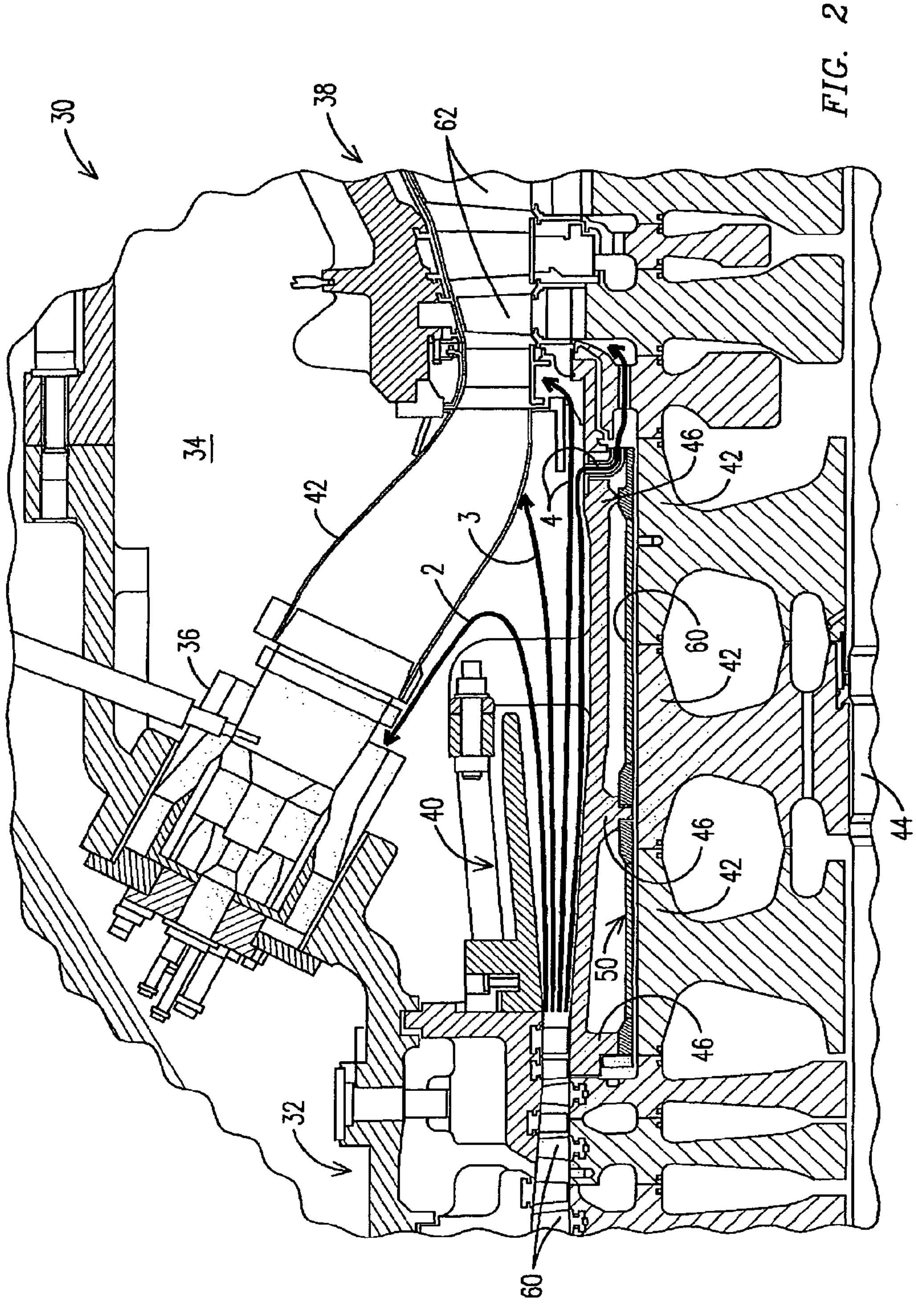
FIG. 2 is a sectional view of a gas turbine engine illustrating seal assemblies of the present invention installed.

With respect to FIG. 2, a partial view of a gas turbine engine 30 is shown as including a compressor 32, a combustion chamber 34, a combustor 36 and turbine 38. A diffuser 40 is shown in fluid communication with the compressor 32 and disperses compressed air generated in the compressor 32. As indicated by flow path arrow 2, air is drawn into the combustor 36 where air is heated to temperatures of about 1300° C. and directed to the turbine 38 via a transition duct 42. Air is also dispersed through the diffuser 40 and follows paths 3 and 4 providing cooling air to the transition duct 42 and a first stage of the turbine 38.

Figure 3:
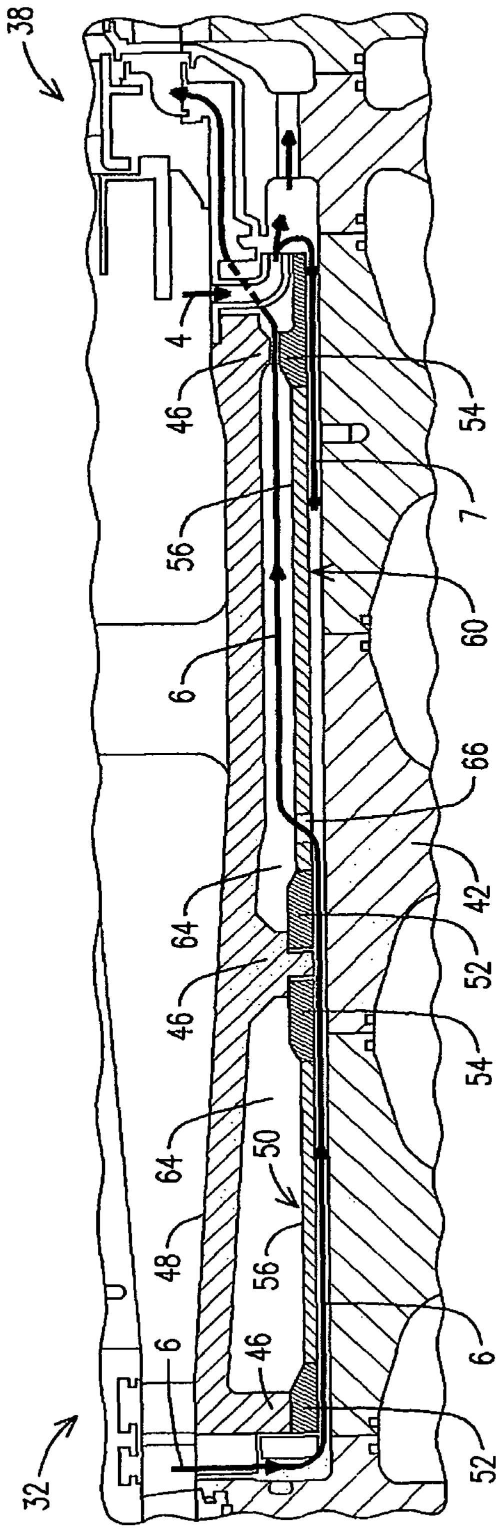
FIG. 3 is a sectional view of the seal assemblies of FIG. 2 illustrating air flow circulation controlled by the seal assemblies.

The diffuser 40 has an annular configuration surrounding rotor disks 43 that are operatively mounted to a rotor 44 for rotating blades 60 and 62 in both the compressor 32 and turbine 38. In addition, the diffuser 40 (as well as the compressor 32 and turbine 38) is generally coaxially aligned with a longitudinal axis of the rotor 44. As shown in FIG. 3, compressed air represented by flow path arrow 6 leaks from the compressor 32 at the interface between the compressor 32 and the diffuser 40 and flows between the rotor disks 43 and diffuser 40. The diffuser 40 includes annular frame members 46 spaced apart on a diffuser wall 48 forming relatively large spaces 62, 64. Air flow from the compressor 32 is metered by providing annular seal assemblies 50, 60 that abut or are attached to the diffuser frame members 46 forming the fluid flow path 6 between the seals assemblies 50, 60 and the rotor disks 43.

As shown, cooling air flows from the compressor along the air flow path 6 between seal assembly 50 (also referred to as a "front seal assembly") and rotor disks 42. In the arrangement illustrated in FIG. 3, the seal assembly 60 (also referred to as the "aft seal assembly") has apertures 66 spaced circumferentially along the seal assembly 60 so that cooling air flows into space 64 and follows a path to an area adjacent to the first stage of the turbine 38 known as a pre-swirler. In addition, air from flow path 4 toward the turbine 38 may be directed along path 7 also between the disks 42 and seal assemblies 50, 60. These particular air paths are known to those skilled in the art; however, as compared to prior art seal assemblies, the seal assemblies 50, 60 of the subject invention are capable of more precisely controlling the gap distance or volume of the fluid flow path 6 between the assemblies 50, 60 and the rotor disks 42.

Figure 1:
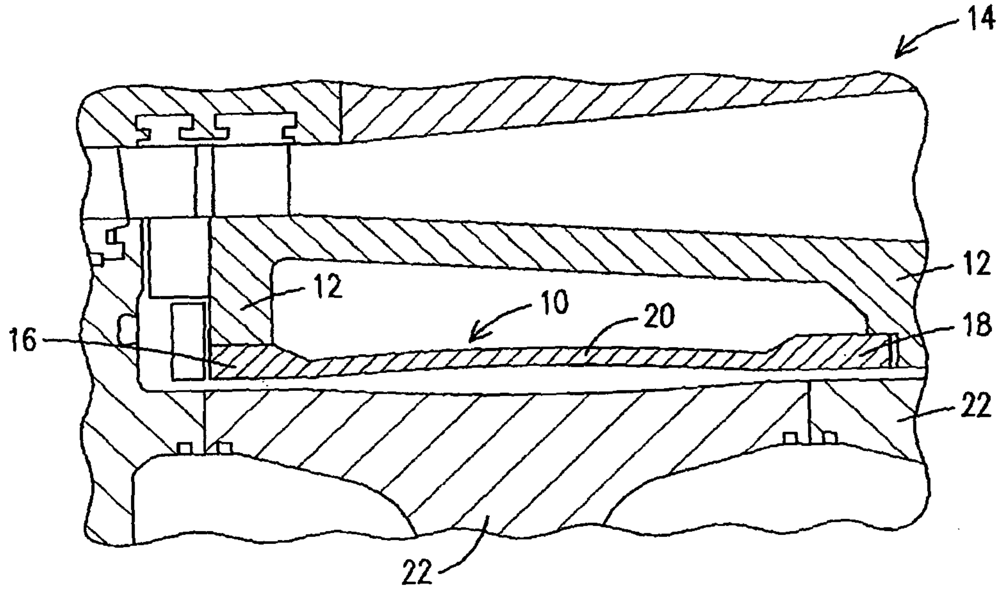
FIG. 1 PRIOR ART
FIG. 1 is a schematic illustration of a prior art seal assembly.
Figure 4A:
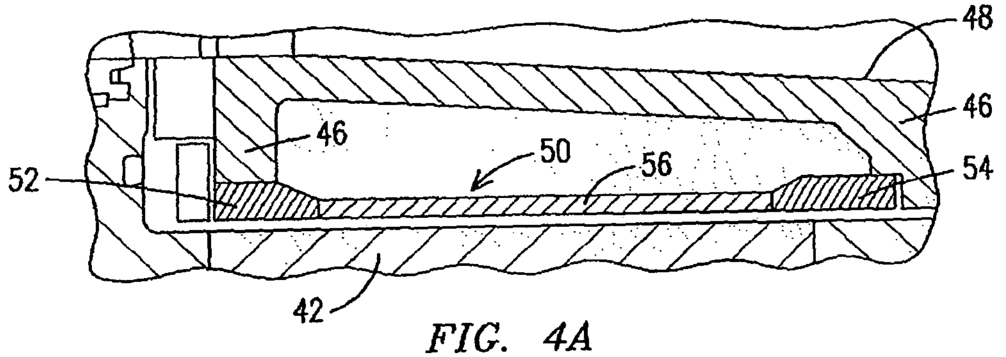
FIGS. 4A and 4B are sectional views of the seal assemblies of FIG. 2 showing control of deformations or variations in a fluid flow path between a diffuser and rotor disks.
Figure 4B:
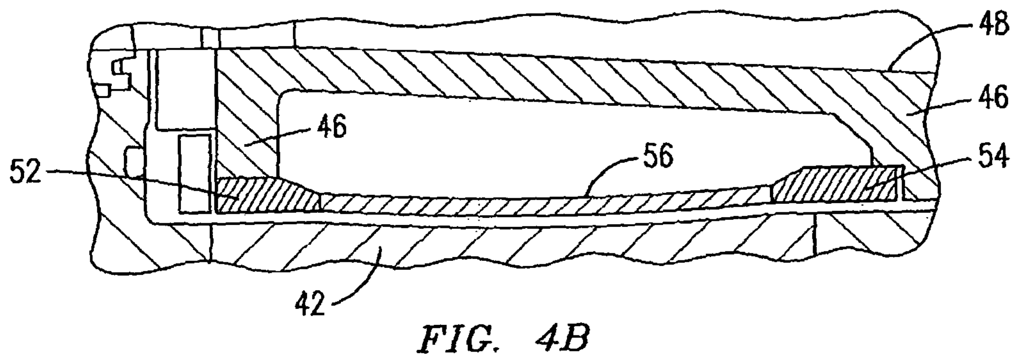

As shown, the two seal assemblies 50, 60 in FIGS. 3, 4A and 4B, include similar configurations; therefore, the same reference numerals are used to identify similar components of the seal assemblies 50, 60. More specifically, each annular seal assembly 50, 60 includes a first flange end 52 and a second flange end 54 abutting a corresponding surface of a diffuser frame member 46. A seal mid-section 56 is disposed between and operatively connected to the first and second flange ends 52, 54 and spaced apart from a surface of the rotor disks 42 forming a gap or flow path 6 therebetween. Either seal assembly 50, 60 may be provided with a mechanical seal 66, such as a labyrinth seal or brush seal that provides a tortuous air flow path along the flow path 6 (FIG. 3) to meter the air flow. The seal mid-section 56 may be welded to the first and second flange ends 52, 52 using known techniques and materials. In a preferred embodiment, the first and second flange ends 52, 54 are secured to the diffuser 40 and diffuser frame member 46 using a shrink fit process such as an induction shrink fitting process.

In the present invention, the seal mid-section 56 is composed of a material that has a coefficient of thermal expansion (CTE) that is different than a coefficient of thermal expansion of a material comprising the first and second flange ends 52, 54. In an embodiment, the materials composing the diffuser frame members 46 have a coefficient of thermal expansion that is the same or substantially the same as those materials of the first and second flange ends 52, 54. Preferably, the CTE of the seal mid-section 56 is less than the respective CTE of the flange end materials and the CTE of the diffuser material.

In an embodiment, the CTE of the mid-section seal 56 material is about ninety percent (90%) or less than the CTE of the material of flange ends 52, 54. For example, in order to meet the thermo-mechanical demands of the operating temperatures of a gas turbine 10, the diffuser 40 and/or diffuser frame member 46 may be composed of stainless steel alloy such as G17CrMo5-5, which has a CTE (at 450° C.) of $13.8\times10^{-6}$ mm/mm/° K. The first and second flange ends 52, 54 may be composed of 13CrMo4-5, which is also a stainless steel alloy having a CTE (at 450° C.) of about $13.8\times10^{-6}$ mm/mm/° K. The seal mid-section 56 may be composed of GX23CrMoV12-1, which has a CTE $11.81\times10^{-6}$ mm/mm/° K.

As described above, the seal assemblies 50, 60 may be used in gas turbine engines such as the SGT5-8000H manufactured by Siemens. In such gas turbines, the seal assemblies 50, 60 are dimensioned to adequately seal the fluid flow path 6 to meter the air flow for cooling. For example, such a gas turbine engine the first and second flange ends 52 may have a thickness ranging from about 35 mm to about 45 mm; and the thickness of the mid-section seal 56 may be about 20 mm to 25 mm. For such an application, the outside diameter of the seal assemblies 50, 60 at the flange ends 52, 54 is about 1.7 meters, and at the mid-section seal the outside diameter is about 1.6 meters.

With respect to FIG. 4B, the seal assembly 50 is shown in a thermo-mechanically deformed state such as may occur during a transient operation of the gas turbine engine 30, or when the engine 30 is operating at a steady state. More specifically, as the diffuser 40 (including frame member 46), first and second flange ends 52, 54 and the seal mid-section 56 heat up towards a steady state operating temperature of about 535° C., these components undergo thermo-mechanical deformations. Inasmuch as the seal mid-section has a relatively small thermal mass, it may heat up more quickly than the flange ends 52, 54 and begin to bow; however, the thermal expansion of the ends 52 that are shrink-fitted contributes to the deformation of the mid-section 56 toward the longitudinal axis of the rotor. For example, in a non-operational state, the gap size of the flow path 6 may be about 2 to 3 mm; however, when the components are heated during operation, the gap size may be reduced to less than 1 mm. In this manner, the flow path 6 or dimension of the flow path is controlled so that it does not expand drawing additional air from the compressor that can be used for combustion.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A seal assembly attached to a first component and in spaced relation to a second component of a machine forming a fluid flow path therebetween, wherein the first and second components and the seal assembly are subject to high operating temperatures that cause thermal expansion of the seal assembly and components, the seal assembly comprising:

a first flange end abutting a first surface of the first component;

a second flange end abutting a second surface of the first component that is spaced apart from the first surface; and, a seal mid-section between and operatively connected to the first and second flange ends;

wherein the first component and first and second flange ends are composed of materials that have substantially the same coefficient of thermal expansion, and the seal mid-section is composed of a material that has a coefficient thermal expansion that is different than that of the first component and first and second flange ends; and the seal mid-section deforms toward the second component when heated towards a steady state operating temperature.

2. The seal assembly of claim 1, wherein the first component is a stationary component and the second component rotates during operation of the machine.

3. The seal assembly of claim 2, wherein the stationary component has an annular configuration surrounding a portion of the second component, and the first and second end flanges and the seal mid-section have annular configurations surrounding a portion of the second component.

4. The seal assembly of claim 3, wherein the stationary component has a first annular frame member and a second annular frame member at which the first and second flange ends respectively attached by shrink fitting the flange ends to the frame members.

5. The seal assembly of claim 3, wherein the seal mid-section has an outside diameter dimension that is smaller than an outside diameter dimension of each of the first flange end and second flange end.

6. The seal assembly of claim 5, wherein the coefficient of thermal expansion of the seal mid-section is less than the coefficient of thermal expansion of the first and second flange ends.

7. The seal assembly of claim 6, wherein the seal assembly is coaxially aligned with a longitudinal axis of the second component and during the operation of the machine, the seal mid-section and a surface of the rotating component undergo thermo-mechanical deformation in the same radial direction.

8. The seal assembly of claim 2, wherein the seal mid-section comprises a labyrinth seal.

9. The seal assembly of claim 2, wherein the seal mid-section comprises a brush seal.

10. An annular seal assembly for a gas turbine engine attached to a stationary component in spaced relation to and surrounding a portion of a rotating component of the gas turbine thereby forming a fluid flow path between the seal assembly and the rotating component, wherein the stationary and rotating components and seal assembly are subject to high operating temperatures that cause thermal expansion of the seal assembly and components, the seal assembly comprising:

a first annular flange end abutting a first surface of the stationary component;

a second annular flange end abutting a second surface of the stationary component that is spaced apart from the first surface; and, an annular seal mid-section between and operatively connected to the first and second flange ends and spaced apart from the rotating component forming the fluid flow path therebetween;

wherein the first component and first and second flange ends are composed of materials that have substantially the same coefficient of thermal expansion, and the seal mid-section is composed of a material that has a coefficient thermal expansion that is different than that of the stationary component and first and second flange ends; and, the annular seal mid-section deforms toward the rotating component.

11. The annular seal assembly of claim 10, wherein the seal assembly is coaxially aligned with a longitudinal axis of the rotating component and during the operation of the machine the annular seal mid-section and a surface of the rotating component undergo thermo-mechanical deformation in the same radial direction relative to the longitudinal axis.

12. The annular seal assembly of claim 11, wherein the coefficient of thermal expansion of the annular seal mid-section is less than the coefficient of thermal expansion of the first and second end flanges.

13. The annular seal assembly of claim 12, wherein the annular seal mid-section has a thickness dimension that is smaller than a thickness dimension of each of the first and second annular flange ends.

14. A gas turbine engine for power generation, comprising:

a rotationally mounted rotor having a longitudinal axis;

a compressor arranged coaxially along a rotor that produces a compressed intake fluid flow;

a combustion chamber arranged downstream of the compressor which receives the fluid flow and a fuel, and combusts the fluid flow and the fuel to form a hot working medium;

an annular diffuser for diverting the fluid flow and is arranged coaxially along the longitudinal axis and is disposed between the compressor and the combustion chamber, and the diffuser having first and second outer frame members spaced apart from one another; and, an annular seal assembly attached to first and second outer frame members and spaced apart from the rotor forming a fluid flow path between the seal assembly and rotor and comprising a first annular flange end abutting the first outer frame member, a second annular flange end abutting the second outer frame member, and an annular seal mid-section between and operatively connected to the first and second annular flange ends;

wherein the outer frame members of the diffuser and first and second annular flange ends are composed of materials that have substantially the same coefficient of thermal expansion, and the annular seal mid-section is composed of a material that has a coefficient thermal expansion that is different than that of the diffuser outer frame members and first and second flange ends; and, during the operation of the machine the seal mid-section and a surface of the rotor undergo thermo-mechanical deformation in the same radial direction relative to the longitudinal axis, wherein the annular seal mid-section deforms toward the rotor.

15. The gas turbine engine of claim 14, wherein the first and second annular flange ends are attached to outer frame member by shrink fitting the respective flange ends to the first and second outer frame members.

* * * * *